United States Patent
Ovshinsky et al.

(10) Patent No.: US 6,524,745 B1
(45) Date of Patent: Feb. 25, 2003

(54) ELECTROCHEMICALLY STABILIZED CANI$_5$ ALLOYS AND ELECTRODES

(75) Inventors: Stanford R. Ovshinsky, Bloomfield Hills, MI (US); Rosa T. Young, Troy, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 09/314,380

(22) Filed: May 19, 1999

(51) Int. Cl.$^7$ .............................. H01M 4/58; C01B 6/24
(52) U.S. Cl. .................. 429/218.2; 429/218.1; 429/206; 420/900; 420/443
(58) Field of Search ............... 429/218.2, 223, 429/218.1, 209, 206; 420/441, 900, 402, 443

(56) References Cited

U.S. PATENT DOCUMENTS 5,242,656 A * 9/1993 Zhang et al. ............... 420/417
5,541,017 A * 7/1996 Hong et al. ................. 429/59
5,695,530 A * 12/1997 Hong et al. ................. 29/623.1
5,962,165 A * 10/1999 Tsuruta et al. ............ 429/218.2

* cited by examiner

Primary Examiner—Stephen Kalafut
Assistant Examiner—Raymond Alejandro
(74) Attorney, Agent, or Firm—David W. Schumaker; Frederick W. Mau II; Marvin S. Siskind

(57) ABSTRACT

An electrochemically stabilized Ca—Ni hydrogen storage alloy material for use as the active negative electrode material of an alkaline electrochemical cell. The alloy material includes at least one modifier element which stabilizes the alloy material from degradation during electrochemical cycling in an alkaline cell, by protecting calcium within the alloy and preventing dissolution of calcium into the alkaline electrolyte. The alloy has the formula $(Ca_{1-x-y}M_xNi_{2y})Ni_{5-z}Q_z$, where M is at least one element selected from the group consisting of misch metal, rare earth metals, zirconium and mixtures of Zr with Ti or V, Q is at least one element selected form the group consisting of Si, Al, Ge, Sn, In, Cu, Zn, Co, and mixtures thereof, x ranges between about 0.02 and 0.2, y ranges between about 0.02 and 0.4, and z ranges from about 0.05 to about 1.00.

51 Claims, 7 Drawing Sheets

ELECTROCHEMICALLY STABILIZED CANI$_5$ ALLOYS AND ELECTRODES

FIELD OF THE INVENTION

The instant invention relates generally to hydrogen storage alloys and more specifically to CaNi$_5$ electrochemical hydrogen storage alloys. Most specifically, the instant invention relates to modified CaNi$_5$ alloys which are electrochemically-stabilized for use in metal hydride batteries.

BACKGROUND OF THE INVENTION

Rechargeable cells that use a nickel hydroxide positive electrode and a metal hydride forming hydrogen storage negative electrode ("metal hydride cells") are known in art. The first hydrogen storage alloys to be investigated as battery electrode materials were TiNi and LaNi$_5$. Many years were spent in studying these simple binary intermetallics because they were known to have the proper hydrogen bond strength for use in electrochemical applications. Despite extensive efforts, however, researchers found these intermetallics to be extremely unstable and of marginal electrochemical value due to a variety of deleterious effects such as slow discharge and poor cycle life brought about by oxidation, corrosion, poor kinetics, and poor catalysis. These simple alloys for battery applications reflect the traditional bias of battery developers toward the use of single element couples of crystalline materials such as NiCd, NaS, LiMS, ZnBr, NiFe, NiZn, and Pb-acid. In order to improve the electrochemical properties of the binary intermetallics while maintaining the hydrogen storage efficiency, early workers began modifying TiNi and LaNi$_5$ based alloys.

In U.S. Pat. No. 4,623,597 ("the '597 patent"), the contents of which are incorporated by reference, one of the present inventors, Ovshinsky, described disordered multicomponent materials for use as negative electrodes in electrochemical cells for the first time. In this patent, Ovshinsky describes how disordered materials can be tailor made to greatly increase hydrogen storage and reversibility characteristics. Such disordered materials are amorphous, microcrystalline, intermediate range order, and/or polycrystalline (lacking long range compositional order) wherein the polycrystaline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. The disordered material had the desired electronic configurations which resulted in a large number of active sites. The nature and number of storage sites was designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods therebetween resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of catalytically active sites for hydrogen dissociation and also of hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

The disorder described in the '597 patent can be of an atomic nature in the form of compositional or configurational disorder provided throughout the bulk of the material or in numerous regions of the material. The disorder also can be introduced into the host matrix by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve important improved and unique results, using the Ovshinsky principles of disorder on an atomic or microscopic scale.

One advantage of the disordered materials of the '597 patent were their resistance to poisoning. Another advantage was their ability to be modified in a substantially continuous range of varying percentages of modifier elements. This ability allows the host matrix to be manipulated by modifiers to tailor-make or engineer hydrogen storage materials with all the desirable characteristics, i.e., high charging/discharging efficiency, high degree of reversibility, high electrical efficiency, long cycle life, high density energy storage, no poisoning and minimal structural change. These same attributes can be achieved for the alloys of the subject patent application.

Throughout the development of hydrogen storage alloys for electrochemical use, certain development principles have applied. Among these are need for the alloy material to 1) be stabile in the corrosive alkaline battery environment, 2) be formed from low cost materials, 3) have the highest possible specific energy density. In order for the alloys to have the highest possible specific energy density, the alloys must be formed from light weight materials and/or store large amounts of hydrogen. Calcium alloys have the ability to store hydrogen and are light weight. Also, calcium is relatively low in cost compared to other hydrogen storage elements. However, as calcium is notorious for it's reactivity in an alkaline environment, to date no calcium alloys have been found which are useful in the corrosive alkaline environment of electrochemical cells. One specific calcium alloy which has been used in the past is $CaNi_5$, see Japanese Published Application No. 53-019,129. Attempts to modify $CaNi_5$ for electrochemical applications were made in the 1970s and 1980s by researchers in Japan. See for instance Japanese Published Applications Numbers: 54-011,095; 55-154,301; 56-169,746; 58-096,842; 58-096,843; 60-172,165; 60-215,724; 61-019,059; 61-019,061; 61-019,062; and 61-168,869. None of these modified alloys proved to be stable materials and therefore are not commercially viable $CaNi_5$ alloys.

Therefore, there is still an urgent need in the art for a low cost, light weight, electrochemically stable alloy with high energy density for use as the negative electrode of a metal hydride electrochemical cell.

SUMMARY OF THE INVENTION

In the broadest sense, the object of the instant invention is a material having at least one crystalline phase defined by a crystal unit cell formed by at least a first element which is substantially inert to degradation from the intended environment of the material and a second element which is subject to degradation from said environment. The unit cell of the material is formed with the first element occupying lattice sites of each unit cell to form a channel within which the second element occupies interior lattice sites. The second element is subject to degradation from unsealed ends of said channel and the improvement is the addition of a third element adapted to atomically engineer the local structural environment of the unit cell such that at least some atoms of the first element occupy some of the sites within the interior of the channel which are normally occupied by atoms of the second element. This seals the channel and prevents the environmental degradation of the second element. The material can also have a fourth element adapted to further atomically engineer the local structural environment of the unit cell. The fourth element has a stronger bond to the second element than does the first element. The fourth element displaces at least some of the first element in the unit cell, thereby holding the second element more strongly within the channel.

More specifically, the object of the instant invention is an electrochemically stabilized Ca—Ni hydrogen storage alloy material for use as the active negative electrode material of an alkaline electrochemical cell. The alloy material includes at least one modifier element which stabilizes the alloy material from electrochemical degradation. during electrochemical cycling in an alkaline electrochemical cell, by protecting calcium within the material and preventing dissolution of calcium into the alkaline electrolyte.

In one embodiment, the electrochemically stabilized Ca—Ni hydrogen storage alloy has the formula $(Ca_{1-x-y}M_xNi_{2y})Ni_5$, where M is at least one element selected from the group consisting of misch metal, rare earth metals, zirconium or mixtures of Zr with Ti or V, x ranges between about 0.02 and 0.2, and y ranges between about 0.02 and 0.4. M is preferably zirconium.

In another embodiment, the alloy has the formula $(Ca_{1-x-y}M_xNi_{2y})Ni_{5-z}Q_z$, where M is at least one element selected from the group consisting of misch metal, rare earth metals, zirconium and mixtures of Zr with Ti or V, Q is at least one element selected form the group consisting of Si, Al, Ge, Sn, In, Cu, Zn, Co, and mixtures thereof, x ranges between about 0.02 and 0.2, y ranges between about 0.02 and 0.4, and z ranges from about 0.05 to about 1.00. M is preferably zirconium and Q is preferably silicon.

DETAILED DESCRIPTION OF THE INVENTION

Figure 1:
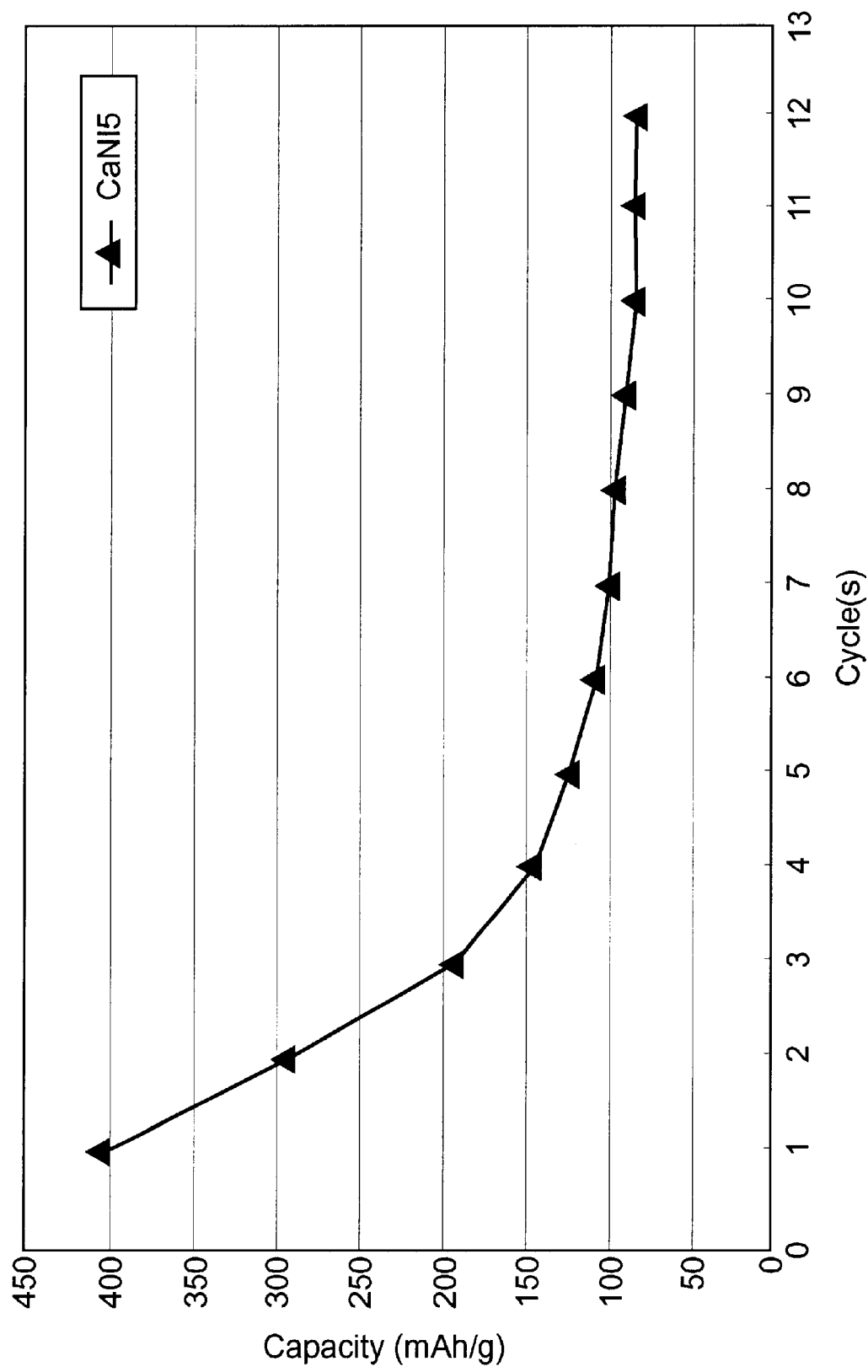
FIG. 1 is a plot of electrochemical capacity versus the number of cycles for unmodified $CaNi_5$ electrodes, specifically shown is the electrochemical degradation that $CaNi_5$ undergoes during cycling.
Figure 2:
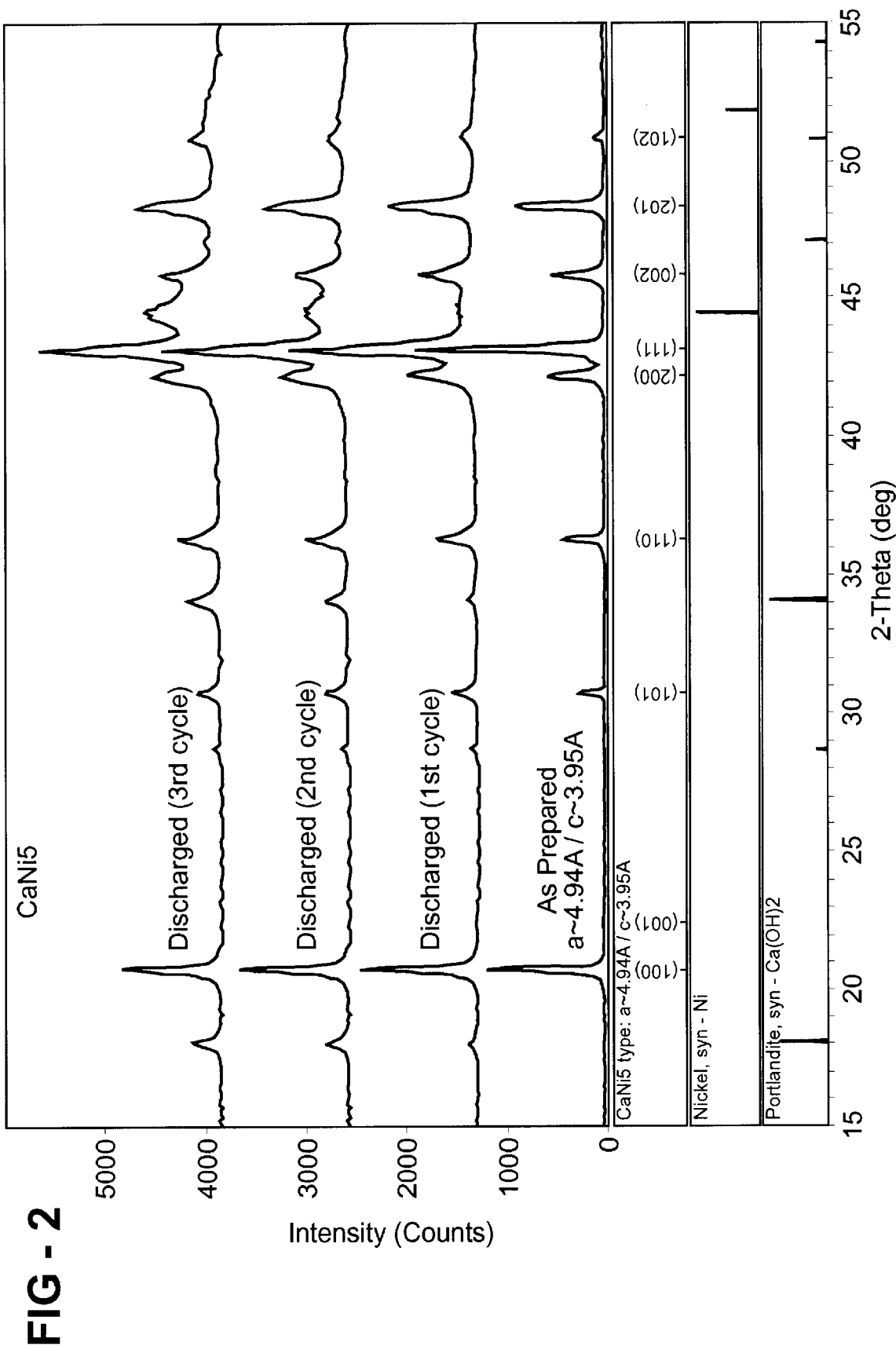
FIG. 2 is a plot of the XRD analysis of unmodified $CaNi_5$ in it's as prepared state, and after the $1^{st}$, $2^{nd}$, and $3^{rd}$ electrochemical cycles, specifically noted is the formation of $Ca(OH)_2$ during cycling.

As discussed above, the Ca—Ni system holds promise for electrochemical storage of hydrogen because of the relatively lower cost of raw materials compared to Misch metal-nickel alloys. Unfortunately the $CaNi_2$ system is very electropositive and therefore the hydride thereof is too stable to be used. The $CaNi_5$ system has the same structure as $MmNi_5$. The hydride, $CaNi_5H_x$, has a higher specific storage capacity than does $MmNi_5H_x$ for the same hydrogen number x, because Ca is a light weight element. Unfortunately, as discussed above and shown in FIG. 1, $CaNi_5$ is electrochemically unstable in an alkaline electrochemical cell. As can been seen, the $CaNi_5$ material drops from a specific capacity of over 400 mAh/g to about 80 mAh/g in only 12 charge/discharge cycles. The instant inventors have learned that $CaNi_5$ deteriorates through the conversion of Ca to $Ca(OH)_2$ and the release of free nickel. This is shown in FIG. 2, which is an XRD plot of an electrochemical $CaNi_5$ material in the as prepared state, after $1^{st}$, $2^{nd}$ and $3^{rd}$ cycles. As can be seen, in the as prepared state the $CaNi_5$ alloy contained no $Ca(OH)_2$ and no free nickel peaks. However, as cycling progressed, from the first to the third cycle, more and more $Ca(OH)_2$ was detected, and more free nickel was produced. Thus the corrosive environment of the battery degrades the $CaNi_5$ material.

Although the electrochemical instability of $CaNi_5$ reflects negatively on the use thereof for electrochemical hydrogen storage, the instant inventors have discovered that the $CaNi_5$ system can be stabilized for electrochemical application. Through the used of the principles of tailored local environments, the instant inventors have created unusual electronic configurations within the $CaNi_5$ alloy. This resulted from the varying 3-dimensional interactions of constituent atoms and their various orbitals. Due to the different degrees of orbital overlap withing the $CaNi_5$ structure, an insignificant amount of structural rearrangement occurs within the $CaNi_5$ alloy, and yet this rearrangement allow for reduced degradation of the $CaNi_5$ material during charge/discharge cycles or rest periods in between. The internal topology that was generated by tailoring the local environment allowed for the selective prevention of diffusion of calcium atoms and ions out from the alloy. These changes in the local order occurred within a single crystalline phase and the tailoring of the local environment modified the physical structure of the alloy by changing the lattice parameters of the single crystalline phase. The changed lattice parameters, in turn, provide additional "room" for the stored hydrogen in the crystalline lattice.

In addition to controlling the local environment for prevention of degradation of the alloy in an alkaline environment, other aspects of local environment tailoring can be employed to independently control the type and number of catalytically active and storage sites. This the $CaNi_5$ structure may be manipulated by modifiers to tailor-make or engineer a hydrogen storage material with all the desirable characteristics, i.e., high charging/discharging efficiency, high degree of reversibility, high electrical efficiency, long cycle life, high density energy storage, no poisoning and, minimal structural change.

Thus, the modification and tailoring of the local environment of the $CaNi_5$ material has produced a new family of electrochemical hydrogen storage alloy materials. It should be noted that the modification and tailoring techniques applied to the Ca—Ni system of the present invention can be applied to other systems to form part of the new family of materials.

An additional feature of the instant Ca—Ni materials are their lower cost. Other materials like La—Ni and Mm—Ni systems employ large amounts of very expensive rare-earth elements, which drive up the cost of manufacturing such hydrogen storage alloys. In contrast, calcium is a very abundant metal, and is relatively inexpensive. Therefore, the instant alloys can be fabricated at a much lower cost than conventional prior art alloys.

The instant inventors have found that the $CaNi_5$ system can stabilized by using non-stoichiometric amounts of Ni and adding one or more elements which promote substitution of the excess nickel into the Ca "A" sites of the $AB_5$ structure. Also, the inventors have found that the addition of one or more elements which bond more strongly with Ca than does Ni assists in the electrochemical stabilization of $CaNi_5$.

Figure 3:
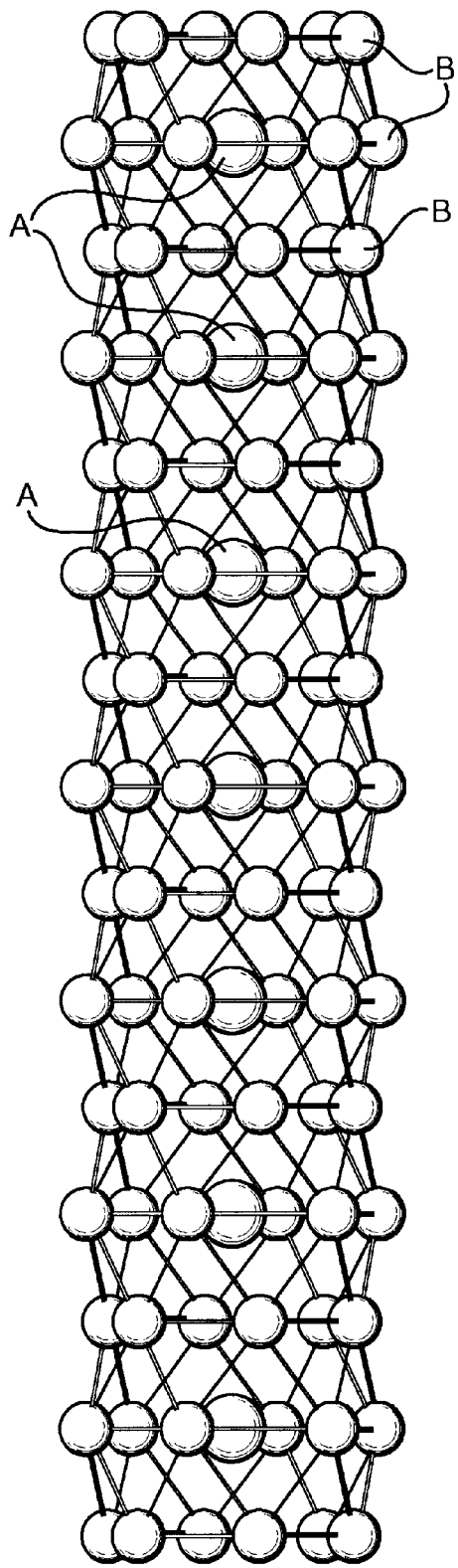
FIG. 3 is a representation of the $AB_5$ structure of unmodified $CaNi_5$, calcium resides withing nickel channels.

While not wishing to be bound by theory, the instant inventors propose the following explanation of this electrochemical stabilization. Stoichiometric $CaNi_5$ has an $AB_5$ in which Ca atoms occupy the "A" sites and Ni atoms occupy the "B" sites. FIG. 3 represents the $AB_5$ structure of $CaNi_5$. The central "A" atoms of the $AB_5$ structure represented by FIG. 3 are calcium atoms, and the surrounding "B" atoms are nickel. The nickel atoms appear to form nickel "channels" around the calcium atoms. The instant inventors theorize that when subjected to electrochemical charging and discharging in the aqueous alkaline environment of the metal hydride battery, the calcium atoms dissolve into the electrolyte through the nickel "channels" and are converted into calcium hydroxide, either within the material or within the electrolyte, leaving behind pure nickel, which is not a hydrogen storage material.

Prior art work has focused on substituting other "A" site elements for Ca and other "B" site elements for Ni. The instant inventors have learned that through the proper choice of substitutional elements and an excessive Ni stoichiometry, the $CaNi_5$ system can be electrochemically stabilized.

Figure 4:
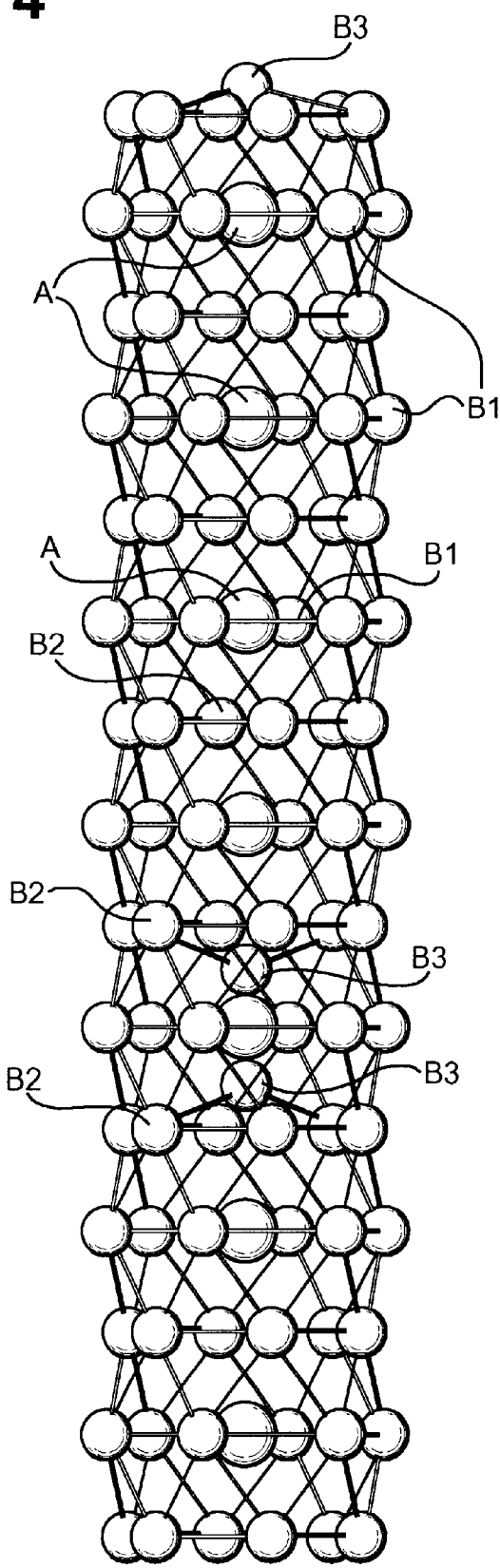
FIG. 4 is a representation of a modified $CaNi_5$ material of one embodiment of the instant invention; the addition of a "plug promoter" element to a nonstoichiometric $CaNi_5$ alloy has caused some of the calcium to be replaced by nickel "plug" atoms which prevent calcium from escaping from the nickel channels of the material.

The instant inventors have found that by the addition of certain elements to a $CaNi_5$ alloy which has stoichiometrically excess nickel, these nickel channels may be periodically blocked along the way, thus preventing calcium from escaping from the nickel channels. The inventors believe that the additional element causes the excess nickel to replace calcium in the "A" sites. This effectively caps the nickel channels with nickel "plugs". The instant inventors have found that zirconium does a very good job of promoting substitution of Ni in the "A" sites. Zirconium forms a $ZrNi_5$ alloy which has a similar structure to $CaNi_5$, and also $ZrNi_5$ has a wide range of solid solution. The inventors have also found that small amounts of rare earth elements and mixtures of zirconium with titanium or vanadium will also work in the same manner. FIG. 4 represents the modified alloy structure, showing the "A" site zirconium and calcium atoms, the "B1" and "B2" site nickel atoms, and the "B3" site nickel "plug" atoms. As can be seen, two nickel "plug" atoms will replace one calcium atom in the structure.

Figure 5:
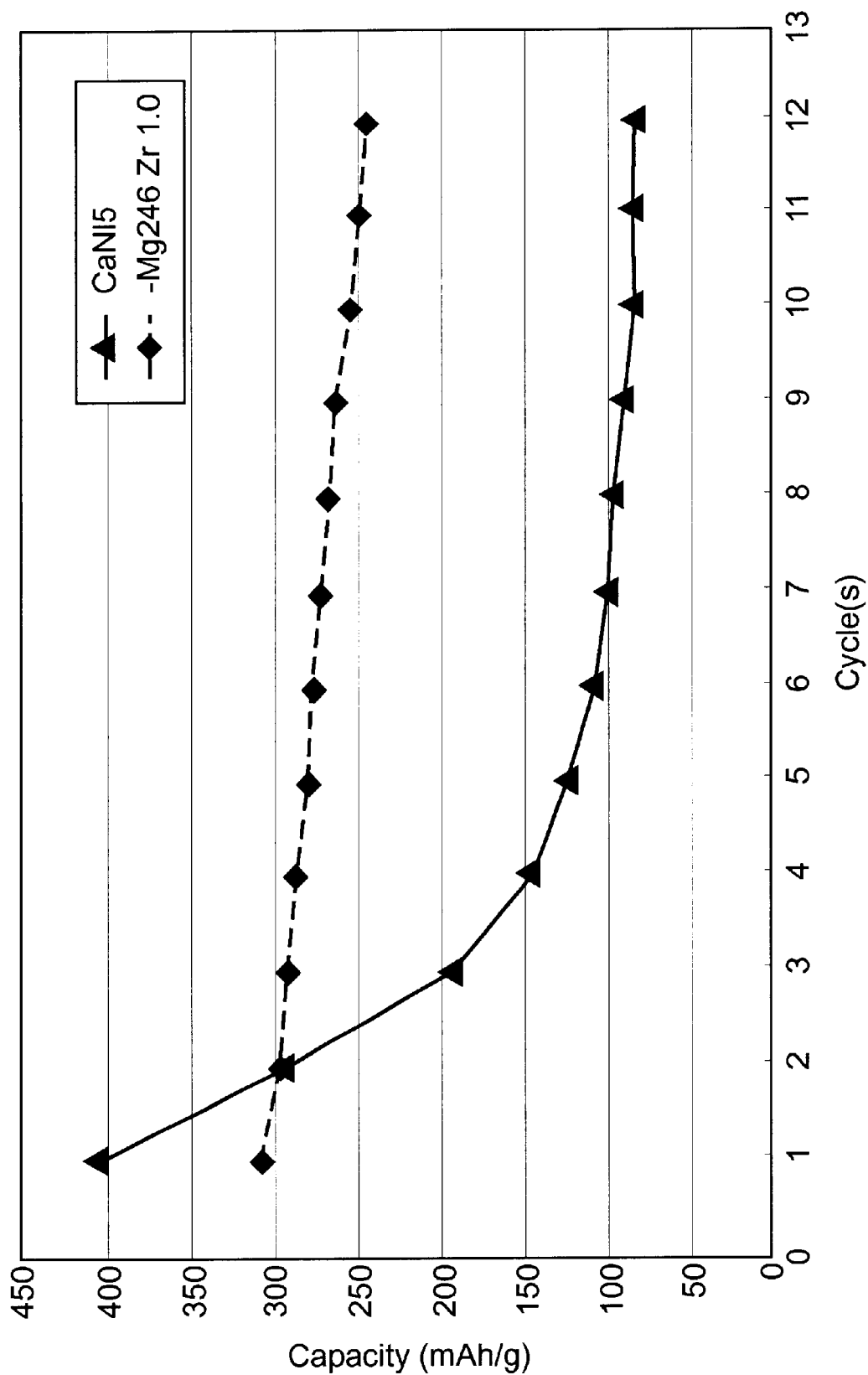
FIG. 5 is a plot of electrochemical capacity versus the number of cycles for an unmodified $CaNi_5$ alloy and a modified alloy according to one embodiment of the instant invention, to be specifically noted is the vast improvement in the cyclic stability of the modified alloy as compared with the unmodified $CaNi_5$ alloy.

FIG. 5 is a plot of capacity versus number of cycles for an alloy according to the instant invention which has been modified with zirconium. As can be seen, when compared with pure $CaNi_5$ (also replotted in FIG. 5), these alloy shows great improvement in it's electrochemical stability. Thus, the inventors believe that the nickel prevents the degradation of the material by blocking calcium loss along the nickel channel.

Figure 6:
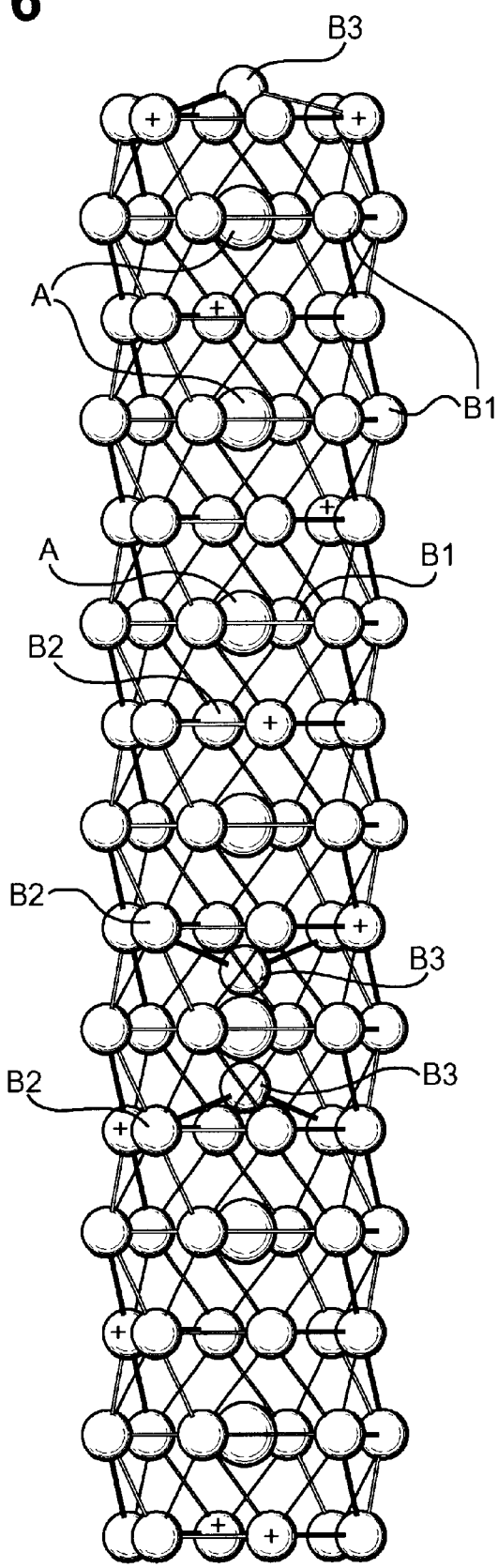
FIG. 6 is a representation of another modified $CaNi_5$ material of a second embodiment of the instant invention; once again the addition of a "plug promoter" element to a nonstoichiometric $CaNi_5$ alloy has caused some of the calcium to be replaced by nickel "plug" atoms, but additionally, the inclusion of a "holder" element has further protected the calcium within the material and further reduced the dissolution of calcium into the electrolyte by more strongly binding to the calcium than does nickel.

While the addition of excess nickel and an effective amount of zirconium will greatly reduce the electrochemical degradation of $CaNi_5$, the instant inventors have found that the addition of another element, which acts as "holder" atoms because they bond more strongly with calcium than does nickel, will protect calcium within the material and prevent calcium from being dissolved out of the nickel channels as well. The instant inventors have found that silicon works well at holding the calcium ions in place in the $CaNi_5$ structure. The inventors believe that the silicon atoms substitute for nickel atoms only in the "B2" sites and react strongly with the Ca atoms to hold them in place and thus protecting them and preventing them from dissolving into the electrolyte. FIG. 6 represents the additionally modified alloy structure, showing the "A" site zirconium and calcium atoms, the "B1" site nickel atoms, the "B3" site nickel "plug" atoms, and the "B2" nickel and silicon "holder" atoms. It should be noted that only a fraction of the "B2" sites (as represented by atoms with a + sign in them) are substituted by silicon atoms, and while a specific number of atoms are represented as being silicon in FIG. 6, this is not representative of the actual ratio of silicon atoms in the alloys.

Figure 7:
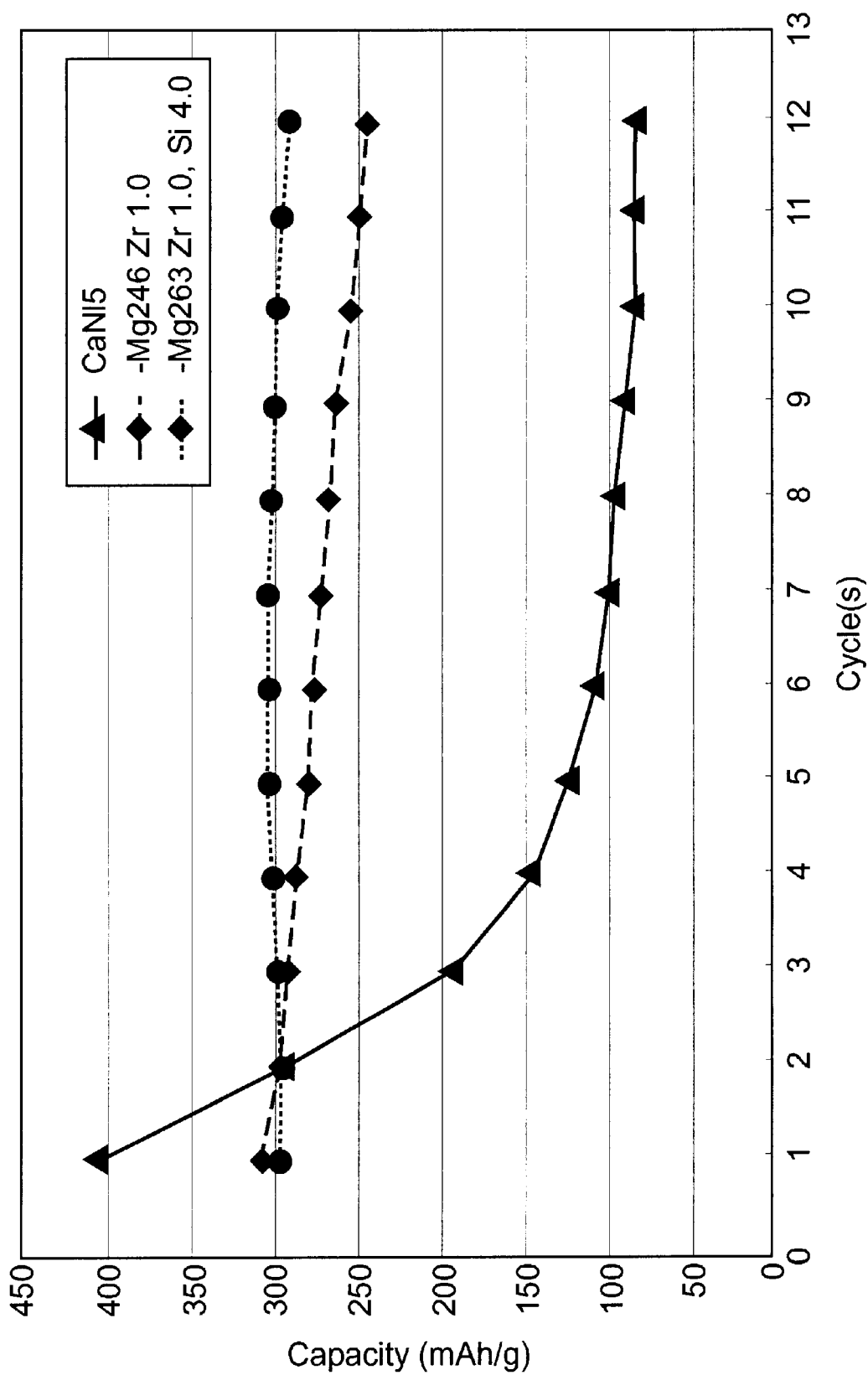
FIG. 7 is a plot of electrochemical capacity versus the number of cycles for an unmodified $CaNi_5$ alloy, and a "plug promoter" modified alloy according to one embodiment of the instant invention, and a "plug promoter" element plus "holder" element modified alloy according to a second embodiment of the instant invention, to be specifically noted is the additional improvement in the cyclic stability of the doubly modified alloy as compared with the singly modified $CaNi_5$ alloy and the unmodified $CaNi_5$ alloy, this material is a perfect example of implementing disorder through the use of engineering at an atomic level.

FIG. 7 is a plot of capacity versus number of cycles for an alloy which have been modified with zirconium and silicon. As can be seen, when compared with pure $CaNi_5$, and alloys modified with just zirconium (both also replotted in FIG. 7), the present alloy materials are very stable in the electrochemical environment of a metal hydride battery.

The instant alloys are then, modifications of the $CaNi_5$ structure. Alloys having excess nickel with the "plug promoter" additive may be represented by the formula $(Ca_{1-x-y}M_xNi_{2y})Ni_5$. This formula takes into account the replacement of some of the calcium by the "plug promoter" element M. This replacement is on a one-to-one basis, one calcium atom for one M atom. The nickel in the "B3" site is the nickel in the formula with the 2x subscript, which indicates two nickel "plug" atoms replace one calcium atom. Finally, the remainder of the nickel is the normal $AB_5$ nickel. M is any element which promotes the formation of the nickel "plugs", such as misch metal, rare earth metals, zirconium or mixtures of Zr with Ti or V. The subscript x ranges between 0.02 and 0.2 and the subscript y ranges between 0.02 and 0.4. These subscripts are not in atomic percent, but are the number of atoms.

The alloys having excess nickel, a "plug promoter" additive and a "holder" additive, can be represented by the formula, $(Ca_{1-x-y}M_xNi_{2y})Ni_{5-z}Q_z$. The values of x and y, and the M elements are the same as the preceding formula, with the added Q element. The additive Q may be any element which can replace the nickel in the "B2" sites and have a stronger bond with calcium than does nickel. The additive Q is selected form the group consisting of Si, Al, Ge, Sn, In, Cu, Zn, Co, and mixtures thereof. The subscript z ranges from about 0.05 to about 1.00.

EXAMPLE 1

An alloy (designation Mg246) having the composition (as analyzed by ICP) Ca 14.1 atomic percent, Zr 0.9 atomic percent, and Ni 85.0 atomic percent was produced by mixing an excess of calcium with nickel, and zirconium and melting the mixture. The excess calcium was added to make up for any lost during melting, since the vapor pressure of calcium at the melting point of the remaining elements is so high. The mixture was heated to about 1290° C. under an argon atmosphere. The melt was poured into an ingot and cooled. The resultant alloy was crushed and formed into negative electrodes. The negative electrodes were incorporated into alkaline rechargeable electrochemical cells, along with positive electrodes, electrode separators and an alkaline (KOH) electrolyte. The results of electrochemical cycling of the cells is shown in FIG. 5.

EXAMPLE 2

An alloy (designation Mg263) having the composition (as analyzed by XRD) Ca 14.9 atomic percent, Zr 0.7 atomic percent, Ni 78.7 atomic percent and Si 5.7 atomic percent was produced by mixing an excess of calcium with nickel, silicon and zirconium and melting the mixture. Again excess calcium was added to make up for any lost during melting. The mixture was heated to about 1290° C. under an argon atmosphere. The melt was poured into an ingot and cooled. The resultant alloy was crushed and formed into negative electrodes. The negative electrodes were incorporated into alkaline rechargeable electrochemical cells, along with positive electrodes, electrode separators and an alkaline (KOH) electrolyte. The results of electrochemical cycling of the cells is shown in FIG. 7.

Finally, it should be noted that while the instant inventors have achieved atomic scale tailoring of the local environment of the instant alloys through the use of modifier elements on slow-cooled alloys, non-stoichiometry and tailoring of the local environment may also be achieved through the use of rapid solidification techniques. The drawings, discussion, descriptions, and examples of this specification are merely illustrative of particular embodiments of the invention and are not meant as limitations upon its practice. It is the following claims, including all equivalents, that define the scope of the invention.

We claim:

1. An electrochemically stabilized Ca—Ni hydrogen storage alloy material for use as active material in negative electrodes of alkaline electrochemical cells, wherein said Ca—Ni hydrogen storage alloy is a non-stochiometric $CaNi_5$ alloy containing excess nickel, said alloy material including at least one modifier element which stabilizes said material from degradation during electrochemical cycling by protecting Ca within the material and substantially eliminating the dissolution of Ca into electrolyte of said alkaline cell.

2. The electrochemically stabilized Ca—Ni hydrogen storage alloy of claim 1, wherein said alloy is formed by rapid solidification.

3. The electrochemically stabilized Ca—Ni hydrogen storage alloy of claim 1, wherein said alloy has a single crystalline structure.

4. The electrochemically stabilized Ca—Ni hydrogen storage alloy of claim 1, wherein said non-stoichiometric $CaNi_5$ alloy has an $AB_5$ crystalline structure in which Ca atoms occupy the A sites and Ni atoms occupy the B sites; the Ni atoms forming a channel with the Ca atoms disposed internally of the channel.

5. The electrochemically stabilized Ca—Ni hydrogen storage alloy of claim 4, wherein said modifier element promotes substitution of the excess nickel of said non-stoichiometric $CaNi_5$ alloy into the A sites, thereby protecting Ca within said alloy and plugging said channel, preventing dissolution of Ca from said channel into the electrolyte of said alkaline cell.

6. The electrochemically stabilized Ca—Ni hydrogen storage alloy of claim 5, wherein said modifier element is at least one element selected from the group consisting of misch metal, rare earth metals, zirconium and mixtures of Zr with Ti or V.

7. The electrochemically stabilized Ca—Ni hydrogen storage alloy of claim 6, wherein said modifier element is zirconium.

8. The electrochemically stabilized Ca—Ni hydrogen storage alloy of claim 1, wherein said alloy has the formula $(Ca_{1-x-y}M_xNi_{2y})Ni_5$, where M is at least one element selected from the group consisting of misch metal, rare earth metals, zirconium or mixtures of Zr with Ti or V, x ranges between about 0.02 and 0.2, and y ranges between about 0.02 and 0.4.

9. The electrochemically stabilized Ca—Ni hydrogen storage alloy of claim 8, where M is zirconium.

10. The electrochemically stabilized Ca—Ni hydrogen storage alloy of claim 4, wherein said modifier element has a stronger binding energy with calcium than does nickel, thereby holding calcium with said channels, protecting calcium within said alloy and substantially preventing dissolution of calcium from said channels into the electrolyte of said alkaline electrochemical cell.

11. The electrochemically stabilized Ca—Ni hydrogen storage alloy of claim 10, wherein said modifier element is at least one element selected from the group consisting of Si, Al, Ge, Sn, In, Cu, Zn, Co, and mixtures thereof.

12. The electrochemically stabilized Ca—Ni hydrogen storage alloy of claim 11, wherein said modifier element is Si.

13. The electrochemically stabilized Ca—Ni hydrogen storage alloy of claim 10 wherein said alloy contains an additional modifier element which promotes substitution of the excess nickel of said non-stoichiometric $CaNi_5$ alloy into the A sites, thereby protecting Ca within said alloy and plugging said channel, preventing dissolution of Ca from said channel into the electrolyte of said alkaline cell.

14. The electrochemically stabilized Ca—Ni hydrogen storage alloy of claim 13, wherein said additional modifier element is at least one element'selected form the group consisting of misch metal, rare earth metals, zirconium, and mixtures of Zr with Ti or V.

15. The electrochemically stabilized Ca—Ni hydrogen storage alloy of claim 14, wherein said additional modifier element is zirconium.

16. The electrochemically stabilized Ca—Ni hydrogen storage alloy of claim 1, wherein said alloy has the formula $(Ca_{1-x-y}M_xN_{2y})Ni_{5-z}Q_z$, where M is at least one element selected from the group consisting of misch metal, rare earth metals, zirconium and mixtures of Zr with Ti or V, Q is at least one element selected form the group consisting of Si, Al, Ge, Sn, In, Cu, Zn, Co, and mixtures thereof, x ranges between about 0.02 and 0.2, y ranges between about 0.02 and 0.4, and z ranges from about 0.05 to about 1.00.

17. The electrochemically stabilized Ca—Ni hydrogen storage alloy of claim 16, wherein M is zirconium and Q is silicon.

18. A negative electrode for use in alkaline electrochemical cells, said negative electrode including an electrochemically stabilized Ca—Ni hydrogen storage alloy material, wherein said Ca—Ni hydrogen storage alloy is a non-stochiometric $CaNi_5$ alloy containing excess nickel, said alloy material including at least one modifier element which stabilizes said material from degradation during electrochemical cycling by protecting Ca within the material and substantially eliminating the dissolution of Ca into electrolyte of said alkaline cell.

19. The negative electrode of claim 18, wherein said alloy is formed by rapid solidification.

20. The negative electrode of claim 18, wherein said alloy has a single crystalline structure.

21. The negative electrode of claim 1, wherein said non-stoichiometric $CaNi_5$ alloy has an $AB_5$ crystalline structure in which Ca atoms occupy the A sites and Ni atoms occupy the B sites; the Ni atoms forming a channel with the Ca atoms disposed internally of the channel.

22. The negative electrode of claim 2, wherein said modifier element promotes substitution of the excess nickel of said non-stoichiometric $CaNi_5$ alloy into the A sites, thereby protecting Ca within said alloy and plugging said channel, preventing dissolution of Ca from said channel into the electrolyte of said alkaline cell.

23. The negative electrode of claim 22, wherein said modifier element is at least one element selected from the group consisting of misch-metal, rare earth metals, zirconium and mixtures of Zr with Ti or V.

24. The negative electrode of claim 23, wherein said modifier element is zirconium.

25. The negative electrode of claim 18, wherein said alloy has the formula $(Ca_{1-x-y}M_xNi_{2y})Ni_5$, where M is at least one element selected from the group consisting of misch metal, rare earth metals, zirconium or mixtures of Zr with Ti or V, x ranges between about 0.02 and 0.2, and y ranges between about 0.02 and 0.4.

26. The negative electrode of claim 25, where M is zirconium.

27. The negative electrode of claim 21, wherein said modifier element has a stronger binding energy with calcium than does nickel, thereby holding calcium with said channels, protecting calcium within said alloy and substantially preventing dissolution of calcium from said channels into the electrolyte of said alkaline electrochemical cell.

28. The negative electrode of claim 27, wherein said modifier element is at least one element selected from the group consisting of Si, Al, Ge, Sn, In, Cu, Zn, Co, and mixtures thereof.

29. The negative electrode of claim 28, wherein said modifier element is Si.

30. The negative electrode of claim 27, wherein said alloy contains an additional modifier element which promotes substitution of the excess nickel of said non-stoichiometric $CaNi_5$ alloy into the A sites, thereby protecting Ca within said alloy and plugging said channel, preventing dissolution of Ca from said channel into the electrolyte of said alkaline cell.

31. The negative electrode of claim 30, wherein said additional modifier element is at least one element selected form the group consisting of misch metal, rare earth metals, zirconium, and mixtures of Zr with Ti or V.

32. The negative electrode of claim 31, wherein said additional modifier element is zirconium.

33. The negative electrode of claim 18, wherein said alloy has the formula $(Ca_{1-x-y}M_xNi_{2y})Ni_{5-z}Q_z$, where M is at least one element selected from the group consisting of misch metal, rare earth metals, zirconium and mixtures of Zr with Ti or V, Q is at least one element selected form the group consisting of Si, Al, Ge, Sn, In, Cu, Zn, Co, and mixtures thereof, x ranges between about 0.02 and 0.2, y ranges between about 0.02 and 0.4, and z ranges from about 0.05 to about 1.00.

34. The negative electrode of claim 33, wherein M is zirconium and Q is silicon.

35. An alkaline rechargeable electrochemical cell including:

at least one negative electrode which includes an electrochemically stabilized Ca—Ni hydrogen storage alloy material, wherein said Ca—Ni hydrogen storage alloy is a non-stochiometric $CaNi_5$ alloy containing excess nickel, said alloy material including at least one modifier element;

a positive electrode;

a separator; and electrolyte, wherein said at least one modifier element stabilizes said material from degradation during electrochemical cycling by protecting Ca within the material and substantially eliminating the dissolution of Ca into the electrolyte of said alkaline cell.

36. The alkaline rechargeable electrochemical cell of claim 35, wherein said alloy is formed by rapid solidification.

37. The alkaline rechargeable electrochemical cell of claim 35, wherein said alloy has a single crystalline structure.

38. The alkaline rechargeable electrochemical cell of claim 1, wherein said non-stoichiometric $CaNi_5$ alloy has an $AB_5$ crystalline structure in which Ca atoms occupy the A sites and Ni atoms occupy the B sites; the Ni atoms forming a channel with the Ca atoms disposed internally of the channel.

39. The alkaline rechargeable electrochemical cell of claim 38, wherein said modifier element promotes substitution of the excess nickel of said non-stoichiometric $CaNi_5$ alloy into the A sites, thereby protecting Ca within said alloy and plugging said channel, preventing dissolution of Ca from said channel into the electrolyte of said alkaline cell.

40. The alkaline rechargeable electrochemical cell of claim 39, wherein said modifier element is at least one element selected from the group consisting of misch metal, rare earth metals, zirconium and mixtures of Zr with Ti or V.

41. The alkaline rechargeable electrochemical cell of claim 40, wherein said modifier element is zirconium.

42. The alkaline rechargeable electrochemical cell of claim 35, wherein said alloy has the formula $(Ca_{1-x-y}M_xNi_{2y})Ni_5$, where M is at least one element selected from the group consisting of misch metal, rare earth metals, zirconium or mixtures of Zr with Ti or V, x ranges between about 0.02 and 0.2, and y ranges between about 0.02 and 0.4.

43. The alkaline rechargeable electrochemical cell of claim 42, where M is zirconium.

44. The alkaline rechargeable electrochemical cell of claim 38, wherein said modifier element has a stronger binding energy with calcium than does nickel, thereby holding calcium with said channels, protecting calcium within said alloy and substantially preventing dissolution of calcium from said channels into the electrolyte of said alkaline electrochemical cell.

45. The alkaline rechargeable electrochemical cell of claim 44, wherein said modifier element is at least one element selected from the group consisting of Si, Al, Ge, Sn, In, Cu, Zn, Co, and mixtures thereof.

46. The alkaline rechargeable electrochemical cell of claim 45, wherein said modifier element is Si.

47. The alkaline rechargeable electrochemical cell of claim 44, wherein said alloy contains an additional modifier element which promotes substitution of the excess nickel of said non-stoichiometric $CaNi_5$ alloy into the A sites, thereby protecting Ca within said alloy and plugging said channel, preventing dissolution of Ca from said channel into the electrolyte of said alkaline cell.

48. The alkaline rechargeable electrochemical cell of claim 47, wherein said additional modifier element is at least one element selected form the group consisting of misch metal, rare earth metals, zirconium, and mixtures of Zr with Ti or V.

49. The alkaline rechargeable electrochemical cell of claim 48, wherein said additional modifier element is zirconium.

50. The alkaline rechargeable electrochemical cell of claim 35, wherein said alloy has the formula $(Ca_{1-x-y}M_xNi_{2y})Ni_{5-z}Q_z$, where M is at least one element selected from the group consisting of misch metal, rare earth metals, zirconium and mixtures of Zr with Ti or V, Q is at least one element selected form the group consisting of Si, Al, Ge, Sn, In, Cu, Zn, Co, and mixtures thereof, x ranges between about 0.02 and 0.2, y ranges between about 0.02 and 0.4, and z ranges from about 0.05 to about 1.00.

51. The alkaline rechargeable electrochemical cell of claim 50, wherein M is zirconium and Q is silicon.

* * * * *